Figure 1:
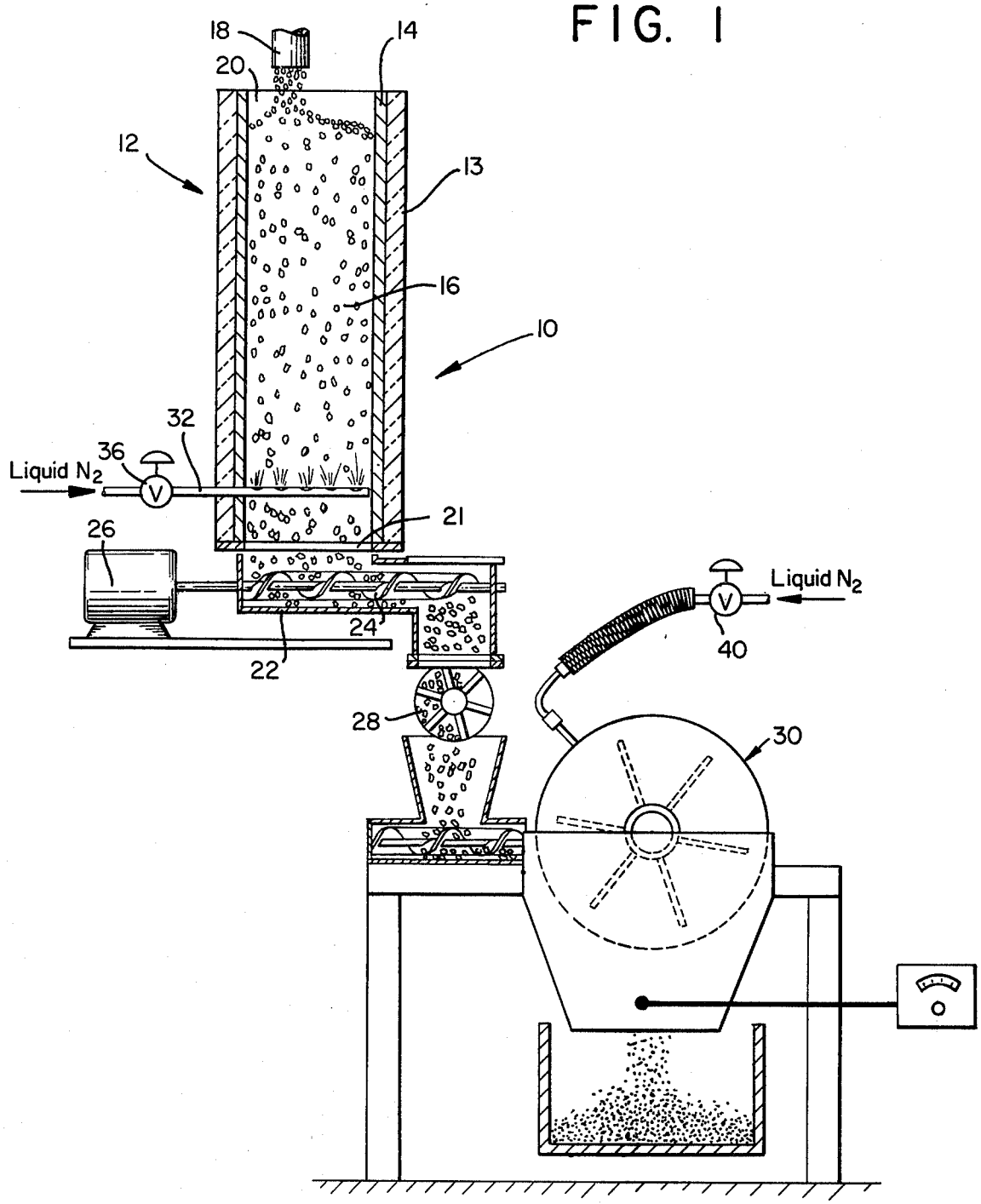

United States Patent [19]

Davis

[11] 4,222,527
[45] Sep. 16, 1980

[54] CRYOPULVERIZING PACKED BED CONTROL SYSTEM

[75] Inventor: Robert B. Davis, Nyack, N.Y.

[73] Assignee: Union Carbide Corporation, New York, N.Y.

[21] Appl. No.: 14,105

[22] Filed: Feb. 22, 1979

[51] Int. Cl.³ .......................................... B02C 13/288
[52] U.S. Cl. ...................................... 241/33; 241/65; 241/DIG. 37
[58] Field of Search ...................... 241/18, 33, 23, 30, 241/27, 65, 66, DIG. 37, 186 R, 186 A

[56] References Cited

U.S. PATENT DOCUMENTS

| | | | |
|---|---|---|---|
| 2,609,150 | 9/1952 | Bludeau | 241/DIG. 37 |
| 2,919,862 | 1/1960 | Beike et al. | 241/23 |
| 3,633,830 | 1/1972 | Oberpriller | 241/18 |
| 3,771,729 | 11/1973 | Frable | 241/DIG. 37 |
| 3,785,575 | 1/1974 | Langmaack et al. | 241/DIG. 37 |
| 3,921,917 | 11/1975 | Meinass | 241/DIG. 37 |
| 3,965,267 | 6/1976 | Davis | 241/DIG. 37 |
| 4,018,633 | 4/1977 | Holland | 241/23 X |
| 4,073,443 | 2/1978 | Danioni | 241/DIG. 37 |

Primary Examiner—Mark Rosenbaum
Attorney, Agent, or Firm—Eugene Lieberstein

[57] ABSTRACT

A control system for optimizing the flow of a cryogenic refrigerant into the precooler and mill of a cryopulverizing system including means responsive to a change in the discharge temperature in the mill for introducing refrigerant into the mill in direct proportion to such temperature change and means responsive to the change in discharge temperature in the mill for introducing refrigerant into the precooler at a linear rate proportional to the product of the material feed rate and the change in discharge temperature and inversely proportional to the residence time of the feed material in the precooler.

10 Claims, 2 Drawing Figures

CRYOPULVERIZING PACKED BED CONTROL SYSTEM

This invention relates to cryogenic pulverizing systems and more particularly to a control system for controlling the injection of a cryogenic refrigerant into a "packed bed" cryopulverizing system. A "packed bed" cryopulverizing system is defined for purposes of the present invention as a system employing a precooler through which feed material is passed in a vertically downward direction opposite to the flow direction of a vaporized liquid refrigerant.

Cryopulverizing involves the brittle fracture of a material which has been cooled below its embrittlement temperature by a cryogenic refrigerant. The rate of consumption of the cryogenic refrigerant, e.g., liquid nitrogen, is a principal factor in comparing competitive cryopulverizing systems. Accordingly, effective control over the supply of liquid nitrogen to the system is essential if consumption is to be minimized.

In a typical cryopulverizing system the starting feed material is initially passed through an insulated precooler before it is transported to the comminuting mill. Liquid refrigerant is fed into the precooler to embrittle the feed material before passage into the mill. For low material thru-put applications the feed material is usually processed through a horizontally oriented precooler having a common enclosure with a screw-conveyor for advancing the the particles through the precooler generally along a horizontal axis at a controlled rate. The residence time for the material in a horizontally oriented precooler is relatively short. Since the residence time is short the flow of liquid refrigerant to the precooler may be varied in response to transient conditions tending to vary the temperature in the comminuting mill so as to maintain a desired mill temperature. This procedure is conventionally practiced to achieve high thermal efficiency with minimum nitrogen consumption.

In applications requiring a high material thruput it is advantageous to use a packed bed arrangement with a preferably vertically oriented precooler to establish a countercurrent flow of liquid refrigerant relative to the direction of flow of the feed material. A packed bed arrangement has an inherently long response time in which to achieve thermal equilibrium in the precooler. The residence time for a packed bed system may be of the order of 3 to 20 minutes or longer depending on the desired material capacity of the precooler. Accordingly, a change in mill temperature resulting from a perturbation in, for example; material feed rate, particle density, liquid nitrogen flow or pressure cannot be readily compensated for in the precooler. To assure a cooling temperature throughout the packed bed below the embrittlement temperature of the feed material, it has, heretofore, been necessary to respond to any perturbation in the system by injecting a high level of auxiliary liquid nitrogen directly into the mill and for substantial periods of time. This procedure is thermodynamically very inefficient and quite costly in terms of liquid notrogen consumption due to the inefficiency of the mill, as opposed to the precooler, in recovering the available refrigeration from the coolant. Control problems are particularly prevalent when attempting to cryopulverize tough materials or when attempting to run the mill close to the maximum thermal operating point.

The control system of the present invention provides maximum thermodynamic efficiency by establishing a relatively constant steady state ratio between material feed rate and the injected rate of liquid nitrogen into the precooler. The need to inject auxiliary refrigerant into the mill is minimized in accordance with the present invention by controllably adjusting the flow of liquid nitrogen to the precooler at a predetermined rate over a predetermined time period in response to changes in the discharge temperature at the mill.

It is therefore the principal object of the present invention to provide a control system for controlling the injection of a liquid refrigerant into a packed bed cryopulverizing system having a vertically oriented precooler.

It is a further object of the present invention to provide a control system which dynamically varies the flow of liquid refrigerant to the precoooler in response to temperature variations in the mill.

Figure 2:
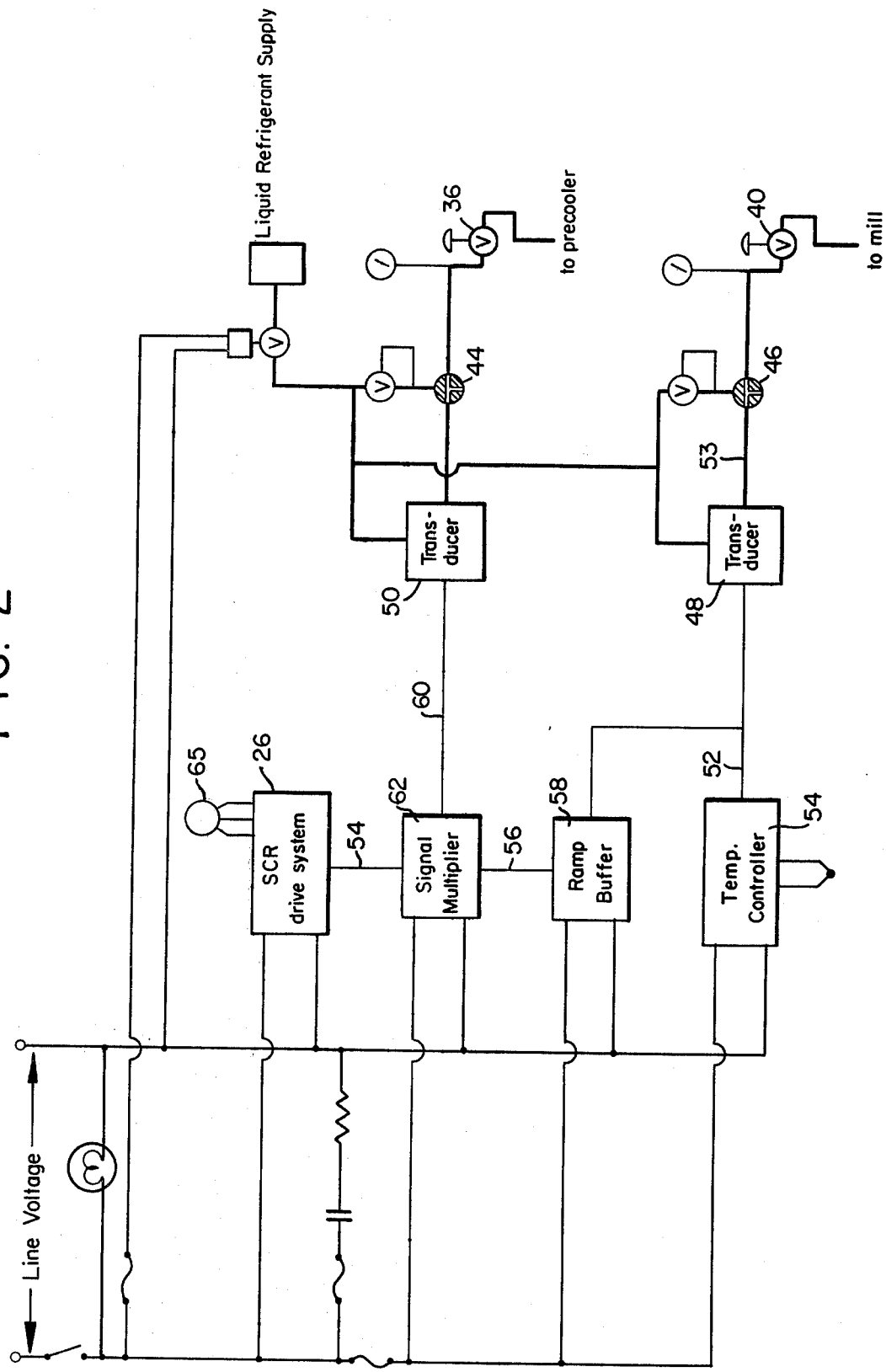

Other objects and advantages of the present invention will become more readily apparent from the following detailed description when taken in conjunction with the accompanying drawings of which:

FIG. 1 is a diagrammatic cross-sectional view of a packed bed cryopulverizing system; and FIG. 2 is a schematic block diagram of the control system of the present invention.

Referring to FIG. 1 of the drawing in which is shown a packed bed cryopulverizing system 10 having a vertically oriented precooler 12. The precooler 12 comprises a hollow housing 14 supported in an upright position upon a platform (not shown) with its longitudinal axis vertically aligned. The housing 14 may be of any desired geometry, e.g. rectangular or tubular having a predetermined cross sectional area "A" and length "L." A thermal insulation material 13 such as a foamed polyurethane or a rigid urethane surrounds the housing 14 in an intimate relationship therewith.

The material 16 to be cryopulverized is fed from a supply hopper or conveyor 18 into the housing 14 through the open top end 20 of the housing 14. The material 16 is supplied as feed material in a particulate granulated form having a predetermined diameter of generally less than about three quarters of an inch. The supply hopper or conveyor 18 feeds the material 16 as needed to maintain the housing 14 in an essentially full condition at all times.

The feed material 16 descends in a vertical direction by gravity through the precooler 12 and discharges through the open bottom end 21. The discharged material falls into a mixer-conveyor assembly 22 which redirects the feed material into the mill 30 at a predetermined rate of feed. The mixer conveyor 22 includes a conventional variable speed auger 24 which is driven at a predetermined rpm by a conventional D.C. variable speed drive motor system 26 such as the solid state SCR drive system model Series 050-1 from Acrison, Inc. The material 16 is fed from the mixerconveyor 22 through a rotary airlock 28 into the comminuting mill 30 where the material 16 is pulverized. The rotary airlock operates to prevent the mill 30 from drawing feed and refrigerant vapors from the precooler into the mill, as well as to prevent feed from being blown into the mill due to gas pressure in the precooler.

A cryogenic refrigerant, such as liquid nitrogen, is introduced into the housing 14 in the form of a liquid spray through a spray header 32 extending within the housing 14 in a substantially horizontal direction perpendicular to the vertical axis of the precooler. The spray header 32 is located a predetermined distance above the bottom end of the precooler to provide sufficient time for equilibration to take place in the feed material 16 before it is discharged. A distance of between 4 to 12 inches separating the spray head from the discharge end 21 of the precooler is acceptable with a 9 inch separation being preferred. The liquid nitrogen is supplied from a conventional storage tank (not shown). Although liquid nitrogen is the preferred cryogenic refrigerant other liquid refrigerants, such as for example, liquified carbon dioxide, air or various liquified halogenated hydrocarbons may be used. Upon discharge from the spray header 32, the liquid nitrogen vaporizes into a cold fluid, and travels in a direction countercurrent to the material feed direction. By definition feed material which is stacked in a vertical column for discharge in a direction opposite to the direction of travel of the vaporized fluid refrigerant is hereafter referred to as a packed bed system. A control valve 36 meters the supply of liquid nitrogen from the storage tank (not shown) to the spray header 32. The control valve 36 is operated by the control system of the present invention as will be explained in more detail hereafter with reference to FIG. 2.

The comminution mill is a conventional hammermill which operates to fracture the material by impact. Other types of well-known comminution mills may also be used in accordance with the present invention depending upon the type of particulate matter to be pulverized and the desired reduction in particle size. Additional liquid nitrogen may also be fed into the comminuting mill from an auxiliary supply or from the storage tank feeding the precooler. The additional liquid nitrogen is supplied through a control valve 40 which meters the auxiliary supply of liquid nitrogen into the mill. The control valve 40 is also operated by the control system of the present invention shown in FIG. 2.

The control valves 36 and 40 are pneumatic valves which may be automatically or manually operated depending upon the position of switches 44 and 48 respectively as shown in FIG. 2. In the automatic mode the control valves 36 and 40 are pneumatically controlled from a pair of conventional electric pneumatic transducers 48 and 50 respectively such as, for example, the electric to pneumatic transducer, Model No. T5100-H from Fairchild Industries Inc.

The transducer 48 responds to an electrical output signal 52 which is generated from a conventional temperature controller 54 such as is manufactured by Barber Colman Inc. The temperature controller 54 monitors the temperature of the pulverized product discharged from the comminuting mill by providing an output signal 52 when the mill exceed a predetermined temperature, preferably representing the maximum thermal operating temperature for the feed material. The output level for the output signal 52 should be of a magnitude during normal operations to cause the transducer 48 to develop a pneumatic signal 53 sufficient to just barely open the mill control valve 40 such that there is essentially zero auxiliary refrigerant supplied to the mill hereinafter referred to and defined as the mill valve "just opened" condition. The attainment of this condition implies maximum system thermal efficiency since virtually all heat exchange is then occurring in the packed-bed precooler. A very small flow of refrigerant through the auxiliary is maintained so that refrigeration to the mill will be immediately available upon demand.

When the temperature in the mill rises above a predetermined equilibrium temperature corresponding to the maximum thermal mill operating level as represented by the setpoint for the output signal 52, a rise in the output signal 52 increases the pneumatic signal 53 in a direct proportion which, in turn, proportionally opens the mill control valve 40 thereby instantaneously adding auxiliary refrigerant to the mill. Simultaneous adjustment is also initiated to vary the flow of liquid nitrogen to the precooler in order to effect a gradual change in precooling temperature over a predetermined time period proportional to the precooler residence time. Accordingly, for a precooler having a long residence time "$t_r$" the rate of change of liquid nitrogen flow into the precooler will be very slow relative to a variation in the output signal 52 whereas for a precooler having a short residence time "$t_r$" the rate at which the liquid nitrogen flow is increased into the precooler will be relatively fast.

The residence time "$t_r$" of the feed material in the precooler may be established in accordance with the following relationship:

$$t_r = \frac{L \times A \times \text{material bulk density}}{\text{material feed rate}}$$

where L as indicated earlier is the height of the packed bed and A the cross-sectional area. By increasing the flow of refrigerant to the precooler the amount of auxiliary refrigerant supplied to the mill will decrease until the "just opened" condition is restored.

The precooler liquid refrigerant valve 36 is controlled by the pneumatic transducer 50 in response to an electrical control signal 60. The electrical control signal 60 is generated from a conventional analog multiplier 62 which performs the function of multiplying the product of two input electrical signals with a predetermined constant. The input signals to the multiplier 62 include the D.C. signal output 54 from the solid state SCR drive system 26 and a D.C. output signal 56 generated from a ramp buffer 58. Any conventional analog multiplier may be used to multiply two independent analog signals together preferably with an adjustable constant. A preferred commercially available analog multiplier is an A×B analog multiplier from Moore Industries, Inc. The D.C. output signal 54 should be directly proportional to the feed rate of the material delivered from the mixer-conveyor 22. The D.C. output signal 56 generated from the ramp buffer 58 varies in response to the output 52 from the temperature controller 54 at a linear rate over any desired signal range.

The ramp buffer 58 is a conventional device which operates as a linear integrator over an adjustable time period for generating a D.C. output signal 56 which varies either positively or negatively at a linear rate over a predetermined signal range in a predetermined time period in direct response to a step variation in input signal. The polarity of the step variation determines the direction of the ramp output. A typical ramp buffer of this type is available commercially from Moore Industries, Inc. A current output signal 52 from the temperature controller 54 is applied as the input signal to the ramp buffer 58. Accordingly, the ramp buffer output signal 56 will vary from a level corresponding to an equilibrium temperature at the mill and rise or fall linearly from this level in accordance with the teachings of the present invention. The signal range for the ramp buffer 58 is selected such that a 100% displacement in the signal output 56 substantially corresponds to at least the residence time "$t_r$" for the feed material in the precooler and the center of the range should correspond to the mill valve "just open" condition. Under these circumstances the rate of change of liquid refrigerant fed into the precooler will be inversely proportional to the residence time $t_r$ and directly proportional to the variation in the magnitude of the ramp buffer output signal 56. Under normal conditions of operation the mill valve should be at the "just open" condition with the precooler at the optimum embrittlement temperature for the feed material in the precooler. The rate at which the cryogenic refrigerant is fed into the precooler is proportional to the product of the material feed rate and the output of the ramp buffer 56. If the rate of change of liquid refrigerant injected into the precooler is too fast relative to the precooler residence time $t_r$, the instantaneous temperature of the feed material at the outlet end 21 of the precooler will be permitted to significantly drop below its optimum embrittlement temperature. The colder feed material will, upon entering the mill, cause the temperature controller 54 to reduce the output signal 56 which, in turn, will proportionally decrease the rate of injection of liquid refrigerant to the precooler at a time when relatively warmer material from the upper end of the precooler is now located in the vicinity of the spray header 32. This relatively warmer material may not be cooled below its embrittlement temperature and may therefor cause an upset melt condition in the mill. On the other hand, if the rate of change of liquid refrigerant injected into the precooler is too slow relative to the precooler residence time $t_r$ the system will require a high level of auxiliary refrigerant to be directly added into the mill for extended periods of time to satisfy the mill temperature controller 54 thereby resulting in a very inefficient operation. The optimum rate of change of refrigerant flow to the precooler is thus seen to be the highest rate of change consistent with a quasi-steady vertical temperature profile of the material within the precooler. This optimum rate of change of injection of refrigerant to the precooler is inversely proportional to the residence time $t_r$ for the feed material in the precooler and directly proportional to the variation in ramp buffer output signal 56 corresponding to the variation in instantaneous temperature at the mill as indicated by the temperature controller.

The system also tries to maintain a steady state mass ratio between feed rate and liquid refrigerant rate in that if the feed rate is decreased by adjustment of the speed potentiometer 65 the liquid refrigerant rate is automatically reduced in the same proportion. This avoids large upsets in thermal equilibrium due to changes in feed rate. This maintainance of a quasi thermal equilibrium in the precooler facilitates the control system's primary function of minimizing auxiliary refrigeration addition.

It should be understood that although the control system shown in FIG. 2 and described herein employs electrical controls to derive the control signals it is obvious that pneumatic or hydraulic control devices may be used. For example, pneumatic devices are commercially available which provide a ramp type output similar to the output provided by the ramp buffer 58. Likewise, there are commercially available pneumatic multipliers which will provide a product output from the pneumatic input signals thereby providing a function equivalent to that of analog multiplier 62.

What is claimed is:

1. A cryopulverizing packed bed system comprising: an insulated vertically oriented precooler into which is fed material to be pulverized and a cryogenic refrigerant in countercurrent directions, a comminuting mill, means for feeding said material from said precooler into said mill at a predetermined material feed rate; first valve means for controlling the supply of cryogenic refrigerant to said precooler, second valve means for supplying cryogenic refrigerant at a controlled rate to said mill and a control system for simultaneously adjusting said first and second valve means, said control system comprising:

means for measuring the temperature of the material discharging from the mill;
    means responsive to the discharge temperature in said mill for generating an output signal when the discharge temperature exceeds a predetermined level, with the magnitude of said output signal being proportional to the magnitude of the discharge temperature;
    means for adjusting the opening of said second valve means in proportion to said output signal;
    means responsive to said output signal for generating a first control signal which varies linearly over a predetermined signal range corresponding to the variation in said output signal and in a time period proportional to the residence time $t_r$ of said feed material in said precooler;
    means for generating a second control signal corresponding to said predetermined material feed rate;
    means for deriving a third control signal proportional to the product of said first and second control signals respectively; and
    means for operating said first valve means in response to said third control signal.

2. A cryopulverizing packed bed system as defined in claim 1 wherein said predetermined signal range is selected such that a 100% displacement in signal output corresponds in time to at least the residence time $t_r$ and with the center of such displacement corresponding to an adjustment of said second valve means to a position where the cryogenic refrigerant supplied to the mill is essentially zero.

3. A cryopulverizing packed bed system as defined in claim 2 wherein said temperature responsive means generates an electrical output which varies in magnitude in proportion to the change in mill temperature from the mill equilibrium temperature.

4. A cryopulverizing packed bed system as defined in claim 3 wherein said means for operating said first valve means comprises an electric to pneumatic transducer with the electrical input connected to the output of said temperature responsive means.

5. A cryopulverizing packed bed system as defined in claim 4 wherein said means for operating said first valve means comprised an analog signal multiplier for generating an electrical product output signal from said first and second control signals and an electric to pneumatic transducer for coupling said product output signal to said first valve means.

6. A cryogenic pulverizing system comprising: an insulated precooler having an inlet end through which feed material is introduced and an outlet end vertically disposed below said inlet end for discharging such feed material:
    a comminuting mill;

means oriented relative to said outlet end for feeding such discharged feed material to said comminuting mill at a manually adjustable feed rate;

a supply of cryogenic refrigerant;

first valve means for injecting cryogenic refrigerant from said supply into said precooler at a predetermined location near said outlet end such that said refrigerant travels through said precooler in a direction countercurrent to the direction of said feed material;

second valve means for injecting cryogenic refrigerant from said supply into said comminuting mill; and control system means for simultaneously adjusting said first and second valve means for optimizing the flow of cryogenic refrigerant into said precooler, said control system comprising;

means for measuring the temperature of the material discharging from the mill;

means responsive to the discharge temperature in said mill for generating an output signal when the discharge temperature exceeds a predetermined level, with the magnitude of said output signal being proportional to the magnitude of the discharge temperature;

means for operating said second valve means in response to said output signal;

means responsive to said output signal for generating a first control signal which varies linearly over a predetermined signal range corresponding to the variation in said output signal and in a time period proportional to the residence time $t_r$ of said feed material in said precooler;

means for generating a second control signal corresponding to said predetermined material feed rate;

means for deriving a third control signal proportional to the product of said first and second control signals respectively; and means for operating said first valve means in response to said third control signal.

7. A cryopulverizing packed bed system as defined in claim 6 wherein said predetermined signal range is selected such that a 100% displacement in signal output corresponds in time to at least the residence time $t_r$ and with the center of such displacement corresponding to an adjustment of said second valve means to a position where the cryogenic refrigerant supplied to the mill is essentially zero.

8. A cryopulverizing packed bed system as defined in claim 7 wherein said temperature responsive means generates an electrical output which varies in magnitude in proportion to the change in mill temperature from the mill equilibrium temperature.

9. A cryopulverizing packed bed system as defined in claim 8 wherein said means for operating said first valve means comprises an electric to pneumatic transducer with the electrical input connected to the output of said temperature responsive means.

10. A cryopulverizing packed bed system as defined in claim 9 wherein said means for operating said first valve means comprised an analog signal multiplier for generating an electrical product output signal from said first and second control signals and an electric to pneumatic transducer for coupling said product output signal to said first valve means.

* * * * *